July 24, 1928.

M. BOWDAN 1,678,419

COMBINATION SOLID AND PNEUMATIC TIRE

Filed June 29, 1927

INVENTOR
M. BOWDAN
BY Hazard and Miller
ATTORNEYS

Patented July 24, 1928.

1,678,419

UNITED STATES PATENT OFFICE.

MELVIN BOWDAN, OF LOS ANGELES, CALIFORNIA.

COMBINATION SOLID AND PNEUMATIC TIRE.

Application filed June 29, 1927. Serial No. 202,237.

My invention is a combination solid and pneumatic tire in which the pneumatic tire contruction gives a type of pneumatic tire resiliency, and the solid tire takes the road wear and is supported on the pneumatic tire, the pneumatic tire being connected directly to the vehicle wheel.

Another object of my invention is the construction of a special type of wheel having a felly with a removable section adapted to support a pair of pneumatic tires placed side by side, and outside of these tires there is a free metal ring moulded on the inside of each a shape as to engage the outer periphery of the pneumatic tire, and on this ring or rim there is secured a solid rubber tire.

My invention will be more readily understood from the following description and drawings, in which.

Figure 1:
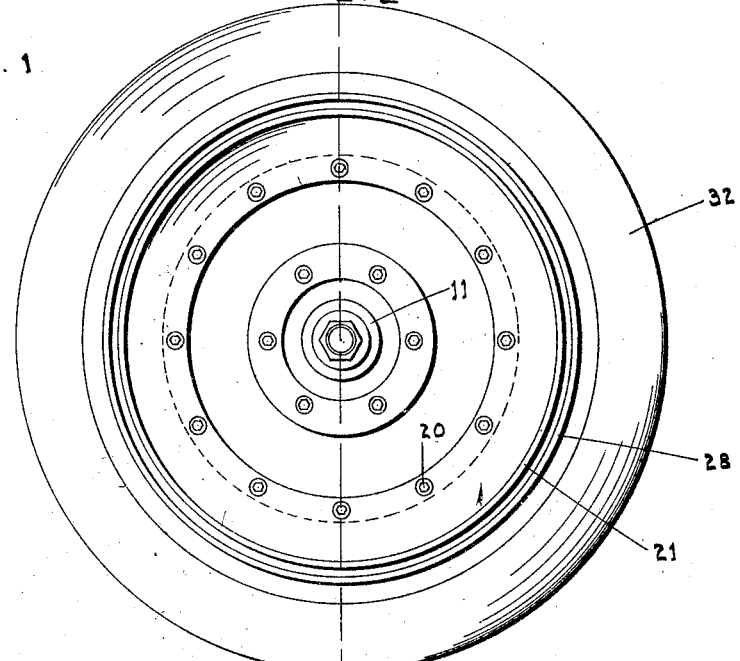
Figure 1 is a side elevation of a wheel having my tire secured thereon.

The construction of the wheel is substantially as follows:

This is illustrated as having a hub 11 of any suitable character, and moulded to the hub there is a disc 12, or in place of a disc, a spoke structure may be utilized. The disc has a flange 13 preferably turned inwardly and forming the base for supporting the wheel felly 14. The center section 15 of the felly is preferably cylindrical and is secured to the flange 13 by rivets 16 or the like. The felly has a curved out turned edge 17. Secured to the outside of the disc there is an outer felly flange 18 having an annular ring section 19 fastened to the disc 12 by bolts or screws 20, this giving a detachable side to the felly. Mounted on the cylindrical part of the felly there is a wedge shaped loose ring 21 which is free to slide slightly crossways of the felly.

The pneumatic construction is illustrated by two tires 22 and 23. These are preferably made of the single tube type having fabric and rubber incorporated together, and eliminating the necessity of having an inner tube. Also by this construction these may each be made in a complete ring of the desired strength. A pipe 24 extends from the pneumatic tire 23 through the felly 14 and through the flange 13, and by means of an elbow 25, a valve stem 26. This stem leads to the outside of the wheel, being in a convenient position for inflating the tire. A valve stem 27 is connected to the tire 22 and extends through the removable side of the flange 18 of the felly section, and may be inflated from outside the wheel.

Figures 2, 3, 4:
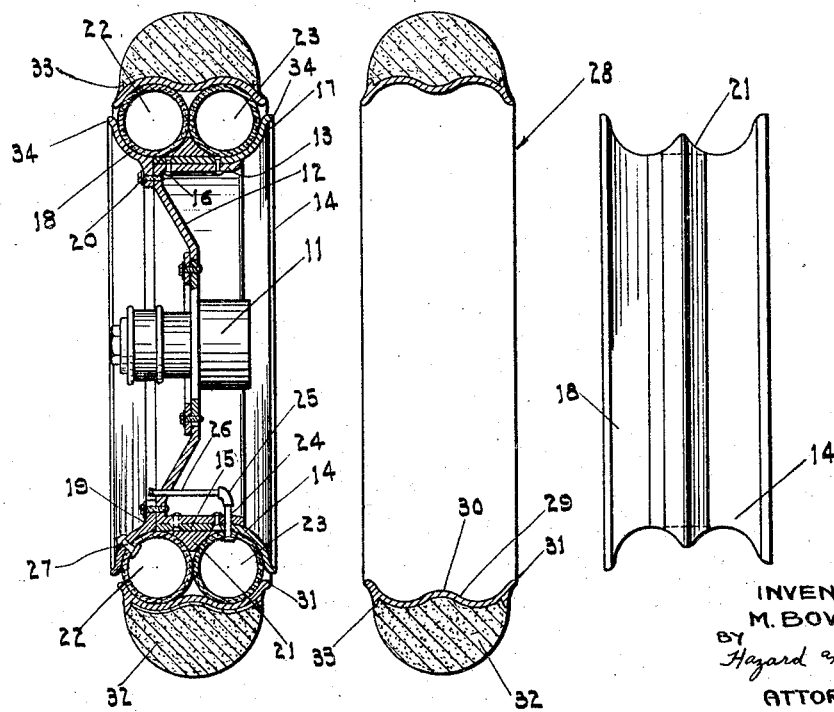
Fig. 2 is a vertical section through the wheel on the line 2—2 of Figure 1.
Fig. 3 is a cross section through the outer rim with the solid tire.
Fig. 4 is an edge elevation of the wheel felly with the removable section and a ring-like wedge mounted thereon.

The solid rim 28 shown particularly in Figures 2 and 3, has an inner double curved section 29 with a hump 30 between such sections, and this rim has inwardly turned edges 31. A solid rubber tire 32 is fitted on the outside of this solid rim and is held in place by outwardly projecting flanges 33.

In the assembly of my wheel and tires, it will be seen that the pneumatic tubes rest and are supported on the felly, which is itself, secured to the wheel structure, and that between these two pneumatic tires there is the annular wedge-like ring 21. While this ring may have a certain sliding movement crossways of the felly and shift substantially around the same. When the tires are inflated, this ring will be held in position without substantial movement. The outer rim 28 is secured in position before the pneumatic tires are inflated, and when these are extended, the outer periphery of each tire fits in the curved section 29 with the hump 30 between the two tire sections so that these tires will bear on a transversely curved surface.

In the action of the wheel in usage, the pneumatic tires are inflated sufficiently so that there is enough resistance to prevent slipping of the rim 28 on the pneumatic tires when the wheel is used as a traction wheel. However, the tires do not need to be inflated to such an extent as to give insufficient resiliency on account of their large bearing surface on the inside surface 29 of the rim 28. In running over the road the rim 28 does not distort in any manner, but the solid tire 32 cushions the same to a certain extent and effects quiet running. The pressure transmitted through the solid tire and the solid rim, flexes the pneumatic tires which give the main resiliency to the wheel. It will be noted that the edge 31 being turned in on the fixed rim 28 is spaced merely a sufficient distance from the outer edge 34 of the inner part 17 and the outer part 18 of the felly, so that these will not contact, but these parts prevent squeezing of the pneumatic tires outwardly.

It will thus be seen that I have developed a wheel which is substantially free from punctures due to being cut in the travel on the road, and that the wheel has a quiet running surface on the road (this being of rubber) and hence also has good adhesion to the road. This solid rubber tire may be made in any suitable manner and with anti-skid surfaces if desired. The pneumatic tires are prevented from direct wear on the road, and as these tires hold the outside rim in substantially immovable relation so far as rotational slipping is concerned, they are subjected to very little wear except that due to the flexing of such tires in their ordinary action. Moreover, the wheel and the tires are simple to assemble and disassemble, and may be made in sizes for passenger vehicles or for trucks of different weights.

Various changes may be made in the principles of my invention without departing from the spirit thereof, as set forth in the description, drawings and claim.

I claim:

A wheel having a felly with a section cylindrical in the transverse direction of the wheel, said felly having flanges, a pair of single tube pneumatic tires circular in cross section when inflated, there being an annular wedge-shaped structure secured to the felly and fitting in the space between the felly and the tires, a solid rim having a plurality of annular curved surfaces, said surfaces being concave on their inner sides considered in a radial section, and a solid rubber tire secured to said rim.

In testimony whereof I have signed my name to this specification.

MELVIN BOWDAN.